Oct. 24, 1950 M. E. COLLINS 2,527,399

METHOD OF RECORDING SOUND ON FILM

Filed May 31, 1946

MILFORD E. COLLINS,
INVENTOR.

BY Vel R. Goshaw

ATTORNEY.

Patented Oct. 24, 1950 2,527,399

UNITED STATES PATENT OFFICE 2,527,399

METHOD OF RECORDING SOUND ON FILM

Milford E. Collins, Studio City, Calif., assignor to Radio Corporation of America, a corporation of Delaware Application May 31, 1946, Serial No. 673,341

1 Claim. (Cl. 179—100.3)

This invention relates to motion picture apparatus, and particularly to a method of and system for recording sound tracks for 16 mm. motion pictures, especially from original 35 mm. color prints.

The general idea of two narrow width picture and sound prints on wide film is shown in Owens U. S. Patent No. 1,858,555 of May 17, 1932, and the general problem of producing 16 mm. color prints from 35 mm. originals is disclosed in McCormick et al. U. S. Patent No. 2,281,075 of April 28, 1942. Furthermore, in my copending U. S. application, Ser. No. 661,274, filed April 11, 1946, now Patent No. 2,499,947, issued March 7, 1950, I disclose and claim a system for directly recording sound tracks for 16 mm. film as negatives and direct positives, while McKie copending application, Ser. No. 636,967, filed December 22, 1945, discloses a method of recording direct positive sound records to be used as printing masters for color motion pictures. The present invention is an improvement in the method of and means for recording the sound tracks, either negative or direct positive, for use in making 16 mm. prints either black and white or color, particularly from an original 35 mm. color print, although it is to be understood that the sound tracks may be similarly recorded for original pictures.

The invention, in brief, utilizes a standard 35 mm. recorder which has been modified to advance 35 mm. film perforated with two rows of standard 16 mm. perforations, while the optical system has been provided with an adjustment for recording on two longitudinal portions on each side of the center of the film. By the use of an optical arrangement, such as shown in Dimmick copending U. S. application, Ser. No. 629,294, filed November 17, 1945, now Patent No. 2,468,047, issued April 26, 1949, either a negative sound record or a direct positive sound record may be impressed upon the film. This is desirable, since, for reversible color release prints, a direct positive is desired as the printing master, while for normal printing operations, it is necessary to have a negative from which to print. With the present invention, either form of sound record may be produced which may be used in accordance with the type of subsequent color printing operation.

The principal object of the invention, therefore, is to facilitate the making of 16 mm. sound motion pictures.

Another object of the invention is to provide an improved method of recording sound tracks for color motion pictures.

A further object of the invention is to provide an improved system for recording sound tracks to be used as printing masters for 16 mm. color pictures.

A still further object of the invention is to provide an improved method of and system for recording 16 mm. sound tracks on 35 mm. film to be used as printing masters for color motion pictures.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figures 1, 2, 3, 4:
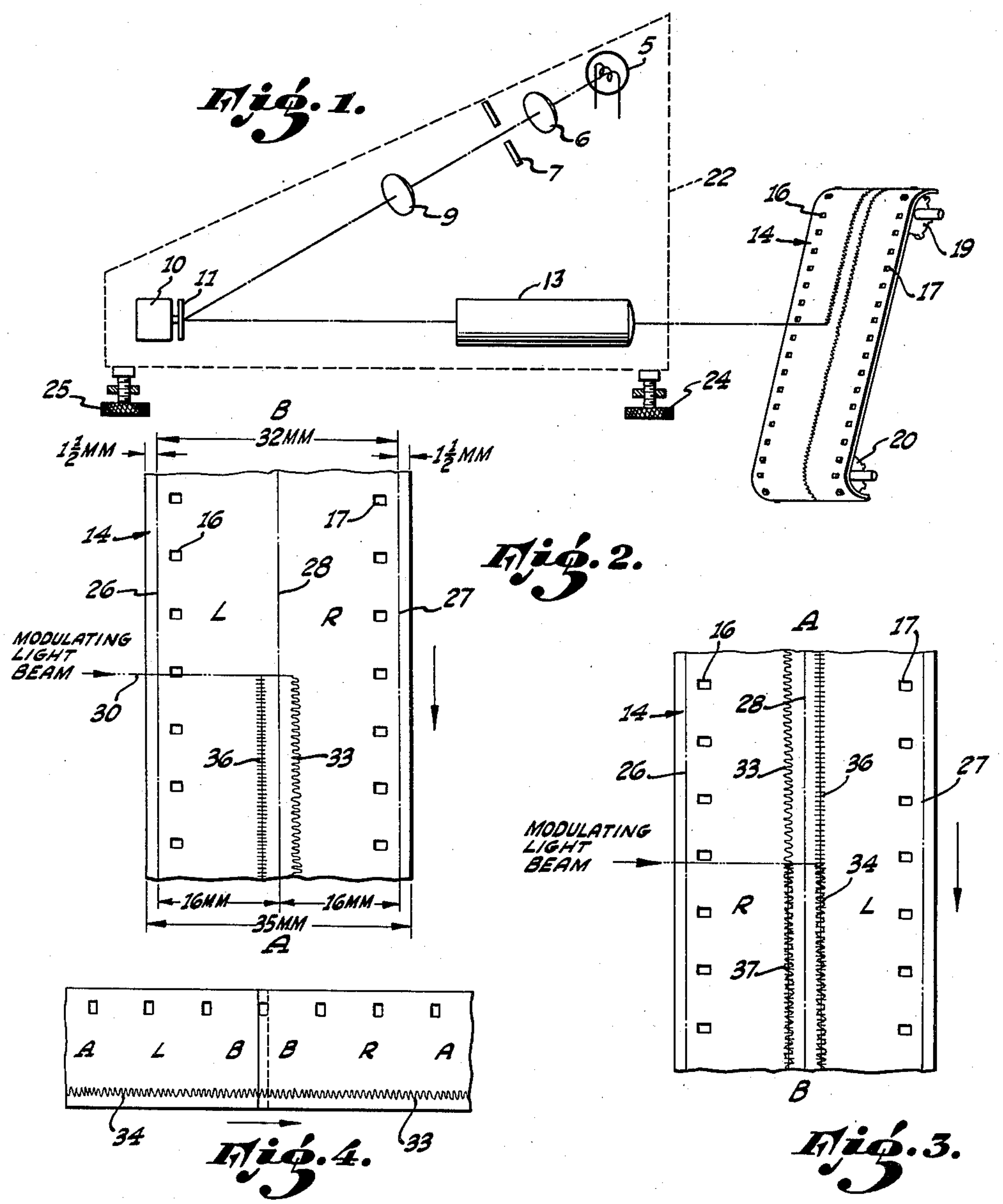
Fig. 1 is a diagrammatic view of a recording system embodying the invention.
Fig. 2 shows a partial section of a 35 mm. film being recorded in one direction.
Fig. 3 is a view of a partial section of the film shown in Fig. 2 being recorded in the opposite direction.
Fig. 4 shows the final film produced in one mode of operation of the invention.

Referring now to the drawings, in which the same numerals identify like elements, the sound recording system diagrammatically shown in Fig. 1 includes a light source 5, a condensing lens 6, an aperture mask 7, a focusing lens 9, a galvanometer 10 having a mirror 11, a slit and projection unit 13, and a film 14. The film 14 is a special film to be described later, and is shown with two rows of sprocket holes 16 and 17 on two sprockets 19 and 20. The entire optical system from 5 to 13 is shown enclosed within the dotted lines 22 to indicate that the units of the system are mounted on a single plate so that by a pair of screw and thumb nut arrangements 24 and 25, the entire system may be shifted to two limiting positions to record a sound record on two different longitudinal portions of the film 14. The optical system is of the standard type modified in accordance with the above-identified Dimmick application.

Referring now to Fig. 2, the film 14 is shown as of 35 mm. width with the two rows of 16 mm. sprocket holes 16 and 17. For purposes of explanation, there are shown two dotted lines 26 and 27, 1½ mm. from the edges of the film, and a center line 28, the portion on the left of the center line being marked L, and the portion on the right of the center line being marked R.

The modulating light beam is indicated at 30, while the direction of film travel through the recorder is indicated by the arrow. Since the film will eventually be a 16 mm. film with a single row of sprocket holes, and the original film is 35 mm. wide, the two strips outside of lines 26 and 27 will eventually be trimmed from the film and the film divided along the center line 28. As these edge strips are 1½ mm. wide, the resulting sections L and R will be 16 mm. wide. A similar film is shown in Fig. 3. In Figs. 2, 3, 4, and 5, the emulsion side of the film is up.

As disclosed in my above-mentioned application, if the proper position of a sound track on 16 mm. film with a single row of sprocket holes is to be obtained in accordance with the subsequent printing operation, it has to be recorded with a definite head and tail position in order to be properly advanced through standard 16 mm. projector equipment. The desired results are obtained with the present invention with a minimum of changes in the recorder and a minimum of operations. First, a standard 35 mm. projector may be used simply by changing the sprockets from those used in advancing standard 35 mm. film to the types shown at 19 and 20 which will advance the special film in which the rows of sprocket holes are closer together and the number of sprocket holes corresponds to those in standard 16 mm. film. Secondly, the recording optical system is adjustable to record on two different longitudinal positions on either side of the center line 28.

Now, to produce a standard negative sound record, the film is advanced through the projector with A as the head end and B, the tail end, the optical system being adjusted to record the sound track on the R section of the film 14 shown by the jagged line 33. When the reel of film has passed completely through the recorder, the reel is then taken off of the take-up spindle and placed on the supply spindle, and the tail end B is then started through the recorder, as shown in Fig. 3. Recording is then continued to produce the sound record 34. Now, if the sections from the dotted lines 26 and 27 to the edge of the film are removed, and the film split along the center line 28, the two ends B placed together, as shown in Fig. 4, a continuous negative record is provided which may be used to print a positive which may be properly run through the standard 16 mm. motion picture projector.

Figure 5:
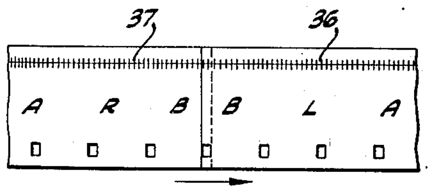
Fig. 5 is a view of the final film produced in another mode of operation of the invention.

Now, if a reversal process is used wherein the same record is produced on the print as on the printing master, then a direct positive is required, such a direct positive being made in the same manner, except that the recording light beam is shifted from record 33 to record 36, shown by the series of parallel lines. The records may be either variable area or variable density in both recordings, the form of the records shown in the drawings being solely for the purpose of explanation. After the record is recorded on section L, as shown in Fig. 2, the film is then reversed through the recorder and the record 37 is recorded on the R section of the film 14. Now, when the edge sections are removed and the film split along line 28, the B ends spliced together, a continuous record will result, as shown in Fig. 5, except that it is a positive record and may be used as a printing master for reversal color prints.

I claim:

The method of producing direct positive types and negative types of sound tracks on different portions of a film with the same elements of a sound recording system, comprising forming light into a predetermined shaped beam, vibrating said beam in accordance with sound waves to be recorded, advancing a light sensitive film emulsion in a definite direction, projecting said light beam to a certain transverse portion of a predetermined longitudinal area of said emulsion to form one of said types of sound track, adjusting the system to produce the other of said types of sound track, again vibrating said beam in accordance with sound waves to be recorded, and projecting said light beam to a different transverse portion of another longitudinal area of said emulsion to form said other type of sound track.

MILFORD E. COLLINS.

REFERENCES CITED

The following references are of record in the file of this patent:

UNITED STATES PATENTS

| Number | Name | Date |
|---|---|---|
| 1,905,442 | Coors, Jr. | Apr. 25, 1933 |
| 1,991,472 | Stern | Feb. 19, 1935 |
| 2,118,622 | Sachtleben | May 24, 1938 |
| 2,281,075 | McCormick | Apr. 28, 1945 |

FOREIGN PATENTS

| Number | Country | Date |
|---|---|---|
| 708,514 | France | July 24, 1931 |